United States Patent
White, Jr.

[11] Patent Number: 6,050,068
[45] Date of Patent: Apr. 18, 2000

[54] PROTECTIVE EYE COVERING FOR ANIMALS

[76] Inventor: Houston R. White, Jr., 15225 E. Riggs Rd., Chandler, Ariz. 85249

[21] Appl. No.: 09/264,232

[22] Filed: Mar. 5, 1999

[51] Int. Cl.[7] ...................................................... B68C 5/00
[52] U.S. Cl. .............................................. 54/80.2
[58] Field of Search .................... 54/80.5, 80.2, 54/80.1, 81, 10; 119/850

[56] References Cited

U.S. PATENT DOCUMENTS

| | | | |
|---|---|---|---|
| 382,668 | 5/1888 | Sullivan . | |
| 449,485 | 3/1891 | Long . | |
| 2,407,029 | 9/1946 | Miller . | |
| 3,778,966 | 12/1973 | Hadley | 54/81 |
| 4,581,877 | 4/1986 | Wilber | 54/80 |
| 4,662,156 | 5/1987 | Oettel | 54/80 |
| 4,756,145 | 7/1988 | Pelling | 54/80 |
| 4,823,540 | 4/1989 | Kosarek | 54/80 |
| 5,321,937 | 6/1994 | Hamilton | 54/80.2 |
| 5,341,627 | 8/1994 | Eby | 54/80 |
| 5,345,751 | 9/1994 | Edwards | 54/80 |
| 5,440,864 | 8/1995 | Green | 54/80 |

*Primary Examiner*—Thomas Price
*Attorney, Agent, or Firm*—Meschkow & Gresham, P.L.C.; Lowell W. Gresham; Jordan M. Meschkow

[57] ABSTRACT

A protective eye covering (20) for a domestic animal (24) includes a flexible material (48) for covering the eyes (34) and adjacent portions of the animal's head (22). The flexible material (48) has a V-shaped lower edge (52) trimmed with a fabric portion (118) and configured to be positioned about an upper muzzle region 40 of the animal. A pair of darts (78, 80) extend from the V-shaped lower edge (52) to form convex portions (82) configured for location over the eyes (34). A pair of ear openings (84, 86), trimmed with fabric portions (110, 114), are located proximate an upper edge (50) of the flexible material (48). A dart (88) and reinforcement strap (98) extend from the upper edge (50) between the ear openings (84, 86) to form a stiff pocket (92) configured for location over the forelock (32) of the animal (24).

20 Claims, 3 Drawing Sheets

PROTECTIVE EYE COVERING FOR ANIMALS

TECHNICAL FIELD OF THE INVENTION

This invention relates generally to protective gear for animals. More particularly, the present invention relates to a protective eye covering for a domestic animal to protect the animal's eyes from insects and dirt and debris.

BACKGROUND OF THE INVENTION

Over the years, insects have been a major cause of irritation to certain domestic animals. Flies are especially troublesome insects because they are attracted by tears. Tears flow down an animal's face from the eyes, and the flies climb or walk up the animal's face on the resulting tear path to the animal's eyes. As a minimum, the flies can cause discomfort to the animal. More critically, the flies cause infection in and around the eye region of the animal.

In order to protect a domestic animal's eyes from insects, different types of protective devices have been developed. Many of the known prior art devices include some strap arrangement for securing a mask or protective article to an animal's head. The straps are cinched tight about the animal's face to prevent insects from crawling beneath the mask. Unfortunately, the tight strap arrangement can cause discomfort and abrasions to the animal in the area where the strap is tight against the animal's face. Furthermore, the tight strap causes hairs to abrade off or turn white, and may cause scar tissue formation. This is particularly true around a horse's nose and is a highly undesirable disfigurement on a valuable show, race, or breeding horse.

In addition, several prior art devices include cutout portions with either screen or some other material fastened to the body of the mask at the cutout portions. The assembly of such prior art devices requires an undesirably large number of seams. Seams are undesirable because they are potential frictional elements for further irritating the animal's skin. Where seams rub on an animal's skin or hair, abraded areas result. Flies may deposit eggs which hatch into fly larvae, known as maggots, in the abraded areas or in any untreated cut. The maggots then live in the abraded or cut areas and cause more serious lesions, infections, and scarring.

One prior art device includes a protective mask for an animal that is made of a continuous one piece screen which covers the eyes and adjacent facial areas of the animal with a single cutout through which the ears and forelock protrude. The protective mask is configured to encircle the bridge of the nose in a relatively straight line, then angle back along the sides of the animal's muzzle to an attachment point beneath the animal's jaw. Relative to an animal's head, the mask has darts extending from a location below each ear to a location proximate each eye, to shape the mask, and has a hook and loop type fastener underneath the head. There is a plush trim around the muzzle area for added comfort and to prevent the flies from crawling beneath the mask along the tear path. In addition, there is plush trim around the single ear cutout for comfort and to prevent the flies from crawling beneath the mask from the ear cutout.

The one piece screen of the prior art device decreases the risk of irritation caused by seams. Unfortunately though, the shape and the positioning of the screen causes excessive pressure across the bridge of the nose and along the sides of the muzzle. In addition, the lower edge of the mask has a tendency to roll up on the nose toward the eyes to further exacerbate the pressure problems. While this protective mask includes the plush trim to mitigate some of the pressure problems, the plush trim has a tendency to collect an excessive amount of debris along the seam between the plush trim and the one piece screen. This excessive debris results in a protective mask that is more difficult to keep clean. Moreover, the single cutout for ears and forelock results in a bigger region through which flies may enter to crawl under the mask.

Another prior art device is a insect control device formed from a single piece of material and having a pair of openings for the ears to protrude. One of the ear openings has hook and loop fasteners so that the opening is adjustable. Thus, the two ear opening configuration and adjustable fit around the ears allows this insect control device to more snugly fit around the ears to prevent flies from crawling under the insect control device through the ear openings. Unfortunately, this insect control device rests against a horse's forelock. It should be noted that the insect control device is more often needed in the summer because flies are much more prevalent in the heat of the summer. Accordingly, extra discomfort results when the forelock is trapped beneath the device from the pressure of the insect control device and heat buildup underneath the forelock.

Like the previously described protective mask, this insect control device is also configured to encircle the bridge of the nose in a relatively straight line, then angle back along the sides of the animal's muzzle to hook and loop fasteners beneath the animal's jaw. Accordingly, this device suffers from the problems of excessive pressure and from the material rolling on the bridge of the nose.

This prior art insect control device does not employ the use of plush trim around the ear openings and the muzzle area. Accordingly, this prior art device avoids the problems of debris collection in the plush trim as discussed in connection with the previously discussed protective mask. Rather, this insect control device includes neoprene material trim on all edges to maintain the shape of the device and to provide a slug fit. Unfortunately, neoprene cannot breathe. In other words, air and moisture cannot easily pass through the neoprene material. Thus, heat buildup causes sweating in the contact area between the animal's skin that does not readily evaporate off of the animal. This trapped moisture causes further irritation to the animal's skin. It would be highly advantageous therefore to remedy the foregoing and other deficiencies inherent in the prior art.

SUMMARY OF THE INVENTION

Accordingly, an advantage of the present invention is that a protective eye covering is provided that fits relatively snug, yet comfortably around the animal's head.

Another advantage of the present invention is that a protective eye covering is provided that resists chafing of the animal's nose.

Another advantage of the present invention is that a protective eye covering is provided that resists rolling up and shifting on the animal's head.

Yet another advantage of the present invention is that a protective eye covering is provided that allows a comfortable fit over the forelock of the animal.

Still another advantage of the present invention is that a protective eye covering is provided with trim material for providing a comfortable fit that also resists the collection of debris.

The above and other advantages of the present invention are carried out in one form by a protective eye covering for a domestic animal comprising a flexible material. The flexible material has an upper edge configured to be positioned about the head of the domestic animal adjacent to the neck of the domestic animal and a V-shaped lower edge configured to be positioned about the nose of the animal. A first side edge extends between the upper edge and the V-shaped lower edge and defines a first side of the protective eye covering. A second side edge extends between the upper edge and the V-shaped lower edge and defines a second side of the protective eye covering.

The above and other advantages of the present invention are carried out in another form by a protective eye covering for a domestic animal, the domestic animal having a forelock. The protective eye covering includes a flexible material for covering the eyes of the domestic animal, the flexible material having an upper edge, a lower edge, a first side edge, and a second side edge. A first opening extends through the flexible material adjacent the upper edge and is adapted to receive a first ear of the domestic animal, and a second opening extends through the flexible material adjacent the upper edge and is adapted to receive a second ear of the domestic animal. A dart extends from the upper edge to a location between the first and second openings to form a pocket in the flexible material. The pocket is configured to be positioned over the forelock and to substantially prevent the protective eye covering from contacting the forelock.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
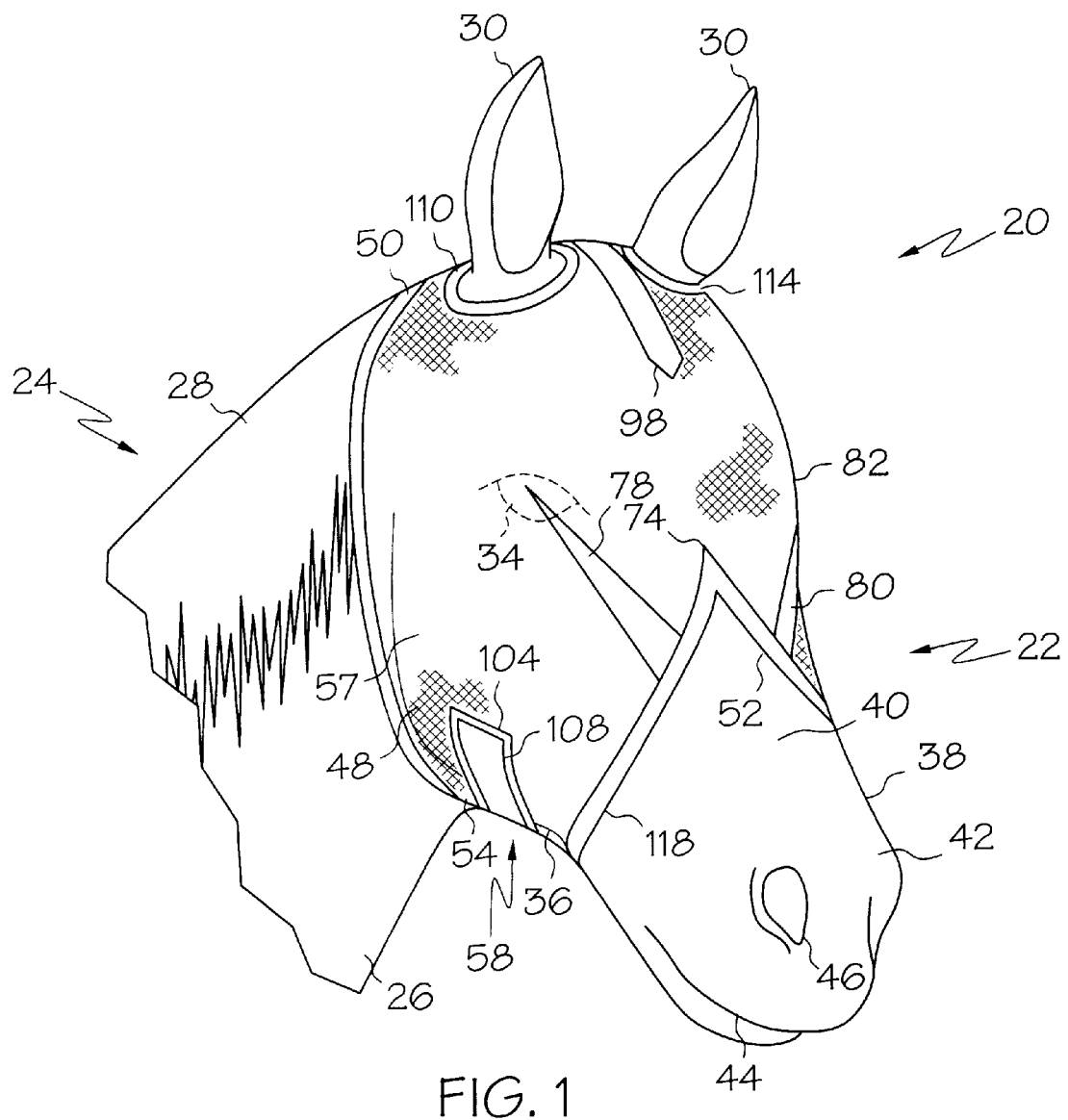
FIG. 1 is a perspective view of a protective eye covering secured on the head of a horse.
Figure 2:
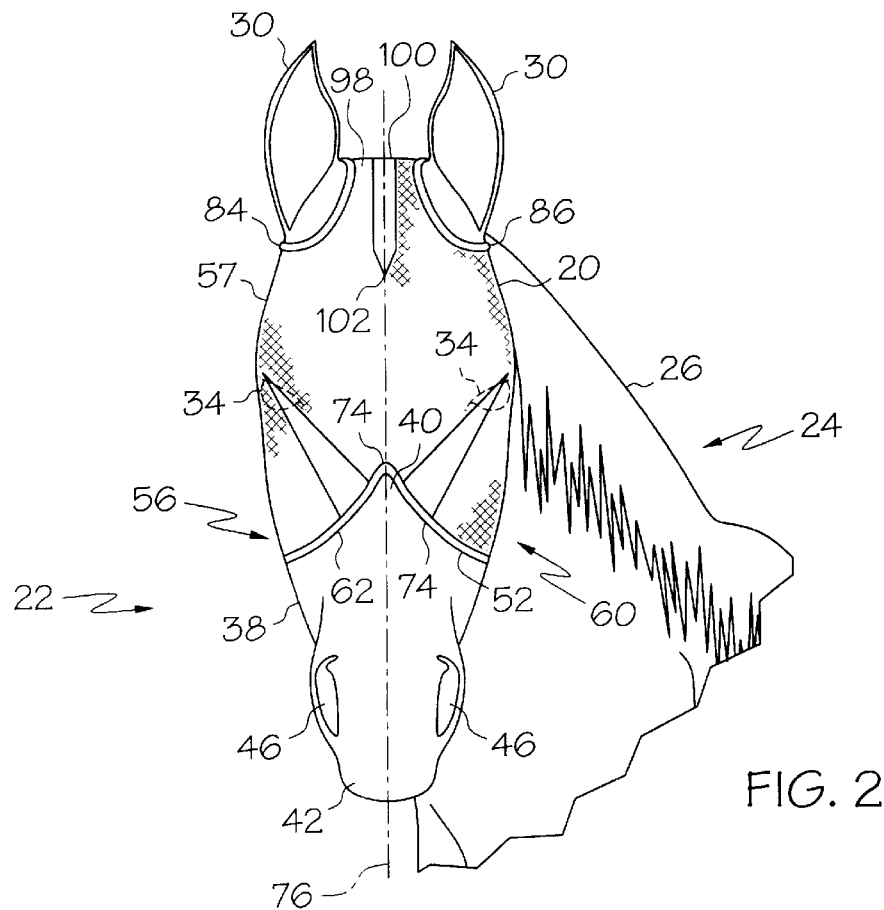
FIG. 2 is a front view of the protective eye covering secured on the head of the horse.
Figure 3:
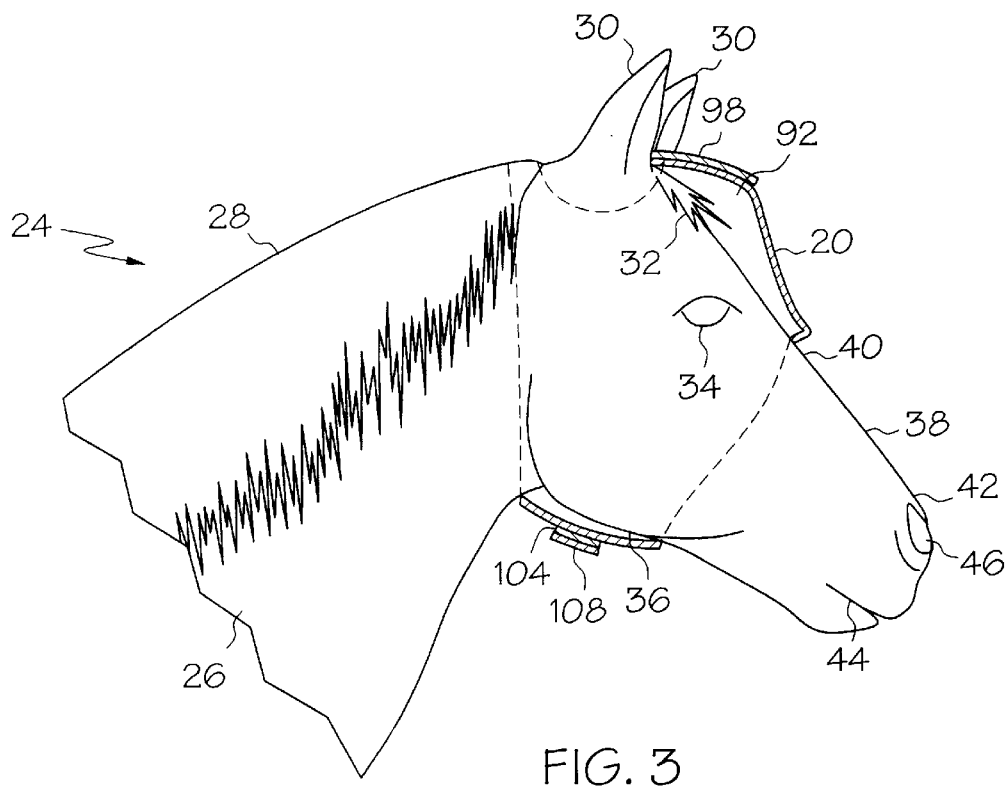
FIG. 3 is a side view in partial section of the protective eye covering secured on the head of the horse.
Figure 4:
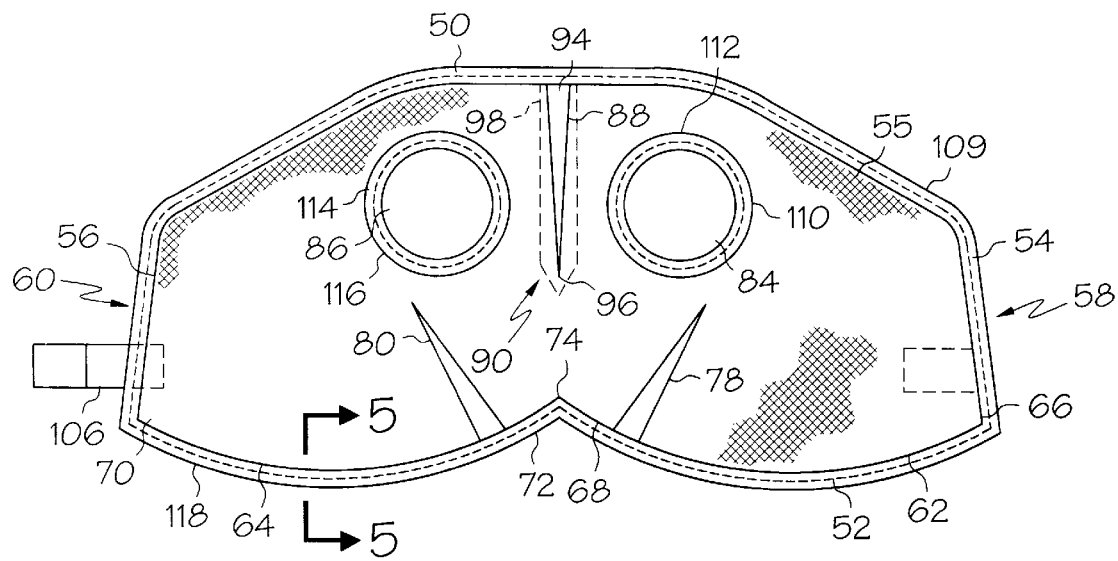
FIG. 4 is a planar view of the protective eye covering removed from the head of the horse.

Referring to FIGS. 1–4, FIG. 1 is a perspective view of a protective eye covering 20 secured on the head 22 of a horse 24. FIG. 2 is a front view of protective eye covering 20 secured on head 22 of horse 24. FIG. 3 is a side view in partial section of protective eye covering 20 secured on head 22 of horse 24, and FIG. 4 is a planar view of protective eye covering 20 removed from horse 24. For illustrative purposes, horse 24 is shown with a neck 26 having a mane 28. Head 22 is shown with ears 30 extending upwardly from the top of head 22 and a forelock 32 extending between ears 30. Head 22 is also shown with eyes 34, a jaw 36, and a muzzle 38 having an upper muzzle region 40 proximate eyes 34 and a lower muzzle region 42 remote from eyes 34. Lower muzzle region 42 includes a mouth 44 and nostrils 46 of horse 24. The significance of the various parts of the horse's head will be realized in the following detailed description of protective eye covering 20.

Although protective eye covering 20 is shown secured to a horse, it should be readily apparent to those skilled in the art that with minor adjustments in sizing, protective eye covering 20 may be adapted for use on a variety of domestic animals to provide solar protection and to prevent insects from getting into the animals' eyes.

Protective eye covering 20 is formed from a flexible material 48 having an upper edge 50, a V-shaped lower edge 52, a first side edge 54, and a second side edge 56. As is best illustrated in FIG. 4, first side edge 54 extends between upper edge 50 and V-shaped lower edge 52 to define a right side 58 of protective eye covering 20. Second side edge 56 extends between upper edge 50 and V-shaped lower edge 52 to define a left side 60 of protective eye covering 20.

Flexible material 48 may also be described as having an inside surface 55 and an outside surface 57 bordered by upper edge 50, V-shaped lower edge 52, first side edge 54, and second side edge 56. Inside surface 55 is configured to face head 22 of horse 24. Outside surface 57 is on a side of flexible material 48 that is opposite from inside surface 55. Accordingly, outside surface 57 is directed outwardly from head 22 and is subjected to sunshine, precipitation, debris, and so forth.

In a preferred embodiment, flexible material 48 is made from a single piece of encapsulated mesh material. The single piece construction reduces the number of seams necessary to assemble protective eye covering 20. The encapsulated mesh material preferably consists of polyester threads coated with an ultraviolet inhibited vinyl. The coated thread is then woven, heated, and pressure is applied which results in a unitary mesh fabric.

The diameter of the mesh size may vary in extent of open and closed area. The greater the closed area of the mesh, the less the solar penetration which provides greater solar protection for the animal's eyes. In addition, a greater closed area of the mesh results in better shading for the animal's face, less debris penetrating the mesh, and decreased ability of insects to penetrate the mesh.

V-shaped lower edge 52 is configured to be positioned about the upper muzzle region 40 of horse 24. V-shaped lower edge 52 includes a first side 62 and a second side 64. First side 62 has first end 66 and a second end 68, first end 66 being coupled to first side edge 54. Likewise, second side 64 has a third end 70 and a fourth end 72, third end 70 being coupled to second side edge 56. Second end 68 and fourth end 72 intersect at an apex 74 of V-shaped lower edge 52. Apex 74 is configured to be positioned proximate a longitudinal centerline 76 of upper muzzle region 40. Apex 74 is also configured to be directed toward, i.e., pointed toward, ears 30 and forelock 32 of horse 24.

V-shaped lower edge 52 results in a pressure relief feature for protective eye covering 20 that causes protective eye covering 20 to resist chafing. Furthermore, the orientation of V-shaped lower edge 52 causes protective eye covering 20 to resist shifting from right to left on head 22. Yet another advantage resulting from such a configuration is that V-shaped lower edge 52 is resistant to rolling on muzzle 38 towards eyes 34 of horse 24.

A first dart 78 is sewn into flexible material 48 and extends upwardly from first side 62 of V-shaped lower edge 52. Likewise, a second dart 80 is sewn into flexible material 48 and extends upwardly from second side 64 of V-shaped lower edge 52. First and second darts 78 and 80, respectively, cause convex portions 82 (of which one is shown in FIG. 1) to form in flexible material 48 of protective eye covering 20. Convex portions 82 are configured for location over eyes 34 of horse 24 so that protective eye covering 20 is not contacting head 22 in the region of eyes 34. This allows horse 24 to blink its eyes without interference between the horses eyelashes and protective eye covering 20.

First and second darts 78 and 80 extend from V-shaped lower edge 52 proximate apex 74. Due to the positioning of apex 74 at upper muzzle region 40, first and second darts 78 and 80 are relatively short, thus resulting in significant stiffening of flexible material 48 near eyes 34 so that convex portions 82 effectively retain their shape.

Upper edge 50 is configured to be positioned about head 22 of horse 24, behind ears 30, and rearwardly of jaw 36, at about the juncture of neck 26 and head 22. A first opening 84 extends through flexible material 48 adjacent upper edge 50 and is adapted to receive one of ears 30. Likewise, a second opening 86 extends through flexible material 48 adjacent upper edge 50 and is adapted to receive the other one of ears 30.

A third dart 88 is sewn into flexible material 48 and extends from upper edge 50 to a location 90 between first and second openings 84 and 86, respectively. Third dart 88 is configured to cause a pocket 92 to be formed in flexible material 48 proximate location 90. With particular reference to FIG. 3, when protective eye covering 20 is secured on head 22 of horse 24, pocket 92 is positioned over forelock 32. Pocket 92 provides space beneath protective eye covering 20 for forelock 32 so that covering 20 does not pressure forelock 32. Consequently, the region of head 22 covered by forelock 32 stays cooler and forelock 32 is not subjected to undue pressure and abrasion.

Third dart 88 has a wide end 94 at upper edge 50 which tapers to a tapered end 96 at location 90. A reinforcement strap 98 is secured to flexible material 48 over third dart 88. Reinforcement strap 98 has a broad end 100 positioned over wide end 94 of third dart 88 and a wedge-shaped end 102 positioned over tapered end 96 of third dart 88. Reinforcement strap 98 is desirably formed from a stiff nylon fabric and is sewn onto outside surface 57 of flexible material 48.

Reinforcement strap 98 serves to add further stiffening properties to flexible material 48 so that pocket 92 retains its desired shape. Wedge-shaped end 102 of reinforcement strap 98 causes pocket 92 to lie over forelock 32 without puckering. In addition, wedge-shaped end 102 prevents pocket 92 from assuming a convex shape which would cause flexible material 48 to contact forelock 32. Thus, wedge-shaped end 102 enhances, the overall function and aesthetic appeal of pocket 92.

Protective eye covering 20 further includes a hook fastener 104 secured to outside surface 57 of flexible material 48 proximate first side edge 54. Likewise, a piece of elastic 106 is secured to outside surface 57 of flexible material 48 proximate second side edge 56. A loop fastener 108 is secured to the end of elastic 106. Hook and loop fasteners 104 and 108, respectively, form a mating pair which is known as a "Velcro" type fastener. When protective eye covering 20 is positioned on head 22, elastic 106 wraps around jaw 36 and loop fastener 108 is coupled to hook fastener 104 to secure covering 20 on head 22. Elastic 106 allows a snug, yet comfortable fit for a variety of animal head sizes, and also stretches with the movement of the head 22 so as to ensure comfort to horse 24.

Protective eye covering 20 has a fabric edging 109 which substantially surrounds upper edge 50, first side edge 54, and second side edge 56. Fabric edging 109 prevents flexible material 48 from fraying and/or irritating the skin of horse 24 at the region of the junction between head 22 and neck 26 and along jaw 36. In addition, fabric edging provides greater durability and helps protective eye covering 20 maintain its shape. In a preferred embodiment, fabric edging 109 is nylon fabric which is folded over each of upper, first side, and second edges 50, 54, and 56 and is sewn on both inside and outside surfaces 55 and 57, respectively, of flexible material 48.

Protective eye covering 20 further includes means for providing cushioned engagement between head 22 and flexible material 48. In a preferred embodiment, a first fabric portion 110 is secured to a first opening edge 112 of first opening 84. A second fabric portion 114 is secured to a second opening edge 116 of second opening 84. A third fabric portion 118 is secured to V-shaped lower edge 52.

First, second, and third fabric portions 110, 114, and 118, respectively, are formed from a synthetic fleece material that serves to protect the skin of horse 24 around ears 30 and along upper muzzle region 40 from being chafed by contact with flexible material 48. In addition, first, second, and third fabric portions 110, 114, and 118, respectively, prevent the entry of insects beneath protective eye covering at each of first and second openings 84 and 86 and at upper muzzle region 40 along V-shaped lower edge 52.

Figure 5:
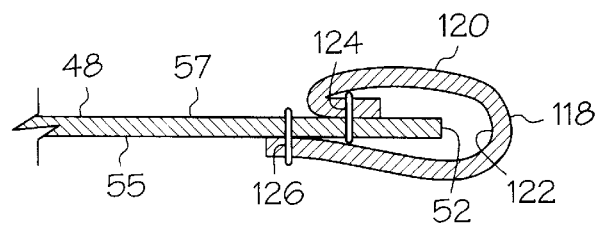
FIG. 5 is a sectional view of the trim fabric on the protective eye covering.

FIG. 5 is a sectional view of third fabric portion 118 secured to V-shaped lower edge 52 of protective eye covering 20. Third fabric portion 118 includes a front side 120 and a back side 122. A first seam 124 is sewn to connect third fabric portion 118 and flexible material 48 such that front side 120 is in contact with outside surface 57 of flexible material 48. Third fabric portion 118 is wrapped around V-shaped lower edge 52 so that first seam 124 is covered by third fabric portion 118. A second seam 126 is subsequently sewn to connect third fabric portion 118 and flexible material 48 suck that back side 122 is in contact with inside surface 55 of flexible material 48. This sewing technique prevents the formation of a small cavity between flexible material 48 and third fabric portion 118 at first seam 124 so that debris such as grass, dirt, sticks, and so forth cannot accumulate.

Although FIG. 5 only shows third fabric portion 118, it should be understood that first and second fabric portions 110 and 114 are secured to first and second opening edges 112 and 116, respectively, in a like manner. Thus, first and second fabric portions 110 and 114, respectively, are also secured to flexible material 48 so as to limit the amount of debris that is accumulated at the location of the seams that connect fabric portions 110 and 114 to flexible material 48.

In summary, the present invention teaches of a protective eye covering that fits relatively snug, yet comfortably around the animal's head. The protective eye covering is formed from a single piece of encapsulated mesh material that has a V-shaped lower edge configured to be positioned about the upper muzzle region of the animal's muzzle. The V-shaped configuration of the lower edge reduces the likelihood of chafing and makes the protective eye covering stable thus resisting rolling up and/or shifting on the animal's head. In addition, short darts extending form the V-shaped lower edge effectively prevent the protective eye covering from rubbing the horse's eyelids and eyelashes. The use of separate ear openings effectively prevents entry of insects at the openings, and the dart and reinforcement strap located between the openings make the protective eye covering stiff over the animal's forelock so that the covering rides above, and not in contact with, the forelock. The V-shaped lower edge and ear openings are edged with cushioning fabric to prevent the entry of insects. In addition, the sewing technique used to attach the fabric to each of the openings and to the V-shaped lower edge prevents a significant amount of debris from collecting between the fabric and the encapsulated mesh material.

Although the preferred embodiments of the invention have been illustrated and described in detail, it will be readily apparent to those skilled in the art that various modifications may be made therein without departing from the spirit of the invention or from the scope of the appended claims. For example, the protective eye covering may assume a different size or shape relative to the size and type of the specific domestic animal that will be wearing it.

What is claimed is:

1. A protective eye covering for a domestic animal comprising:
    a flexible material having
        an upper edge configured to be positioned about the head of said domestic animal adjacent to the neck of said domestic animal,
        a V-shaped lower edge configured to be positioned about the muzzle of said animal,
        a first side edge extending between said upper edge and said V-shaped lower edge and defining a first side of said protective eye covering, and
        a second side edge extending between said upper edge and said V-shaped lower edge and defining a second side of said protective eye covering.

2. A protective eye covering as claimed in claim 1 wherein the muzzle of said domestic animal has an upper muzzle region proximate the eyes of said domestic animal, and a lower muzzle region remote from the eyes of said domestic animal, the mouth and nostrils of said domestic animal being located at said lower muzzle region, and said V-shaped lower edge comprises:
    a first side having first and second ends, said first end being coupled to said first side edge;
    a second side having third and fourth ends, said third end being coupled to said second side edge; and
    an apex at which each of said second and fourth ends intersect, said apex configured to be positioned proximate a longitudinal centerline of said upper muzzle region and to be directed toward the ears of said domestic animal.

3. A protective eye covering as claimed in claim 1 wherein said protective eye covering further includes means secured to said V-shaped lower edge for providing cushioned engagement between the muzzle of said domestic animal and said flexible material to prevent the entry of insects.

4. A protective eye covering as claimed in claim 3 wherein:
    said flexible material further includes inside and outside surfaces bordered by said upper edge, said V-shaped lower edge, said first side edge, and said second side edge, said inside surface being configured to face the head of said domestic animal, and said outside surface being located on a side of said flexible material that is opposite from said inside surface; and
    said providing means is a fabric having a front side and a back side, wherein a first seam secures said front side of said fabric in contact with said outside surface of said flexible material, said fabric wraps around said V-shaped lower edge to cover said first seam, and a second seam connects said back side of said fabric in contact with said inside surface of said flexible material.

5. A protective eye covering as claimed in claim 1 wherein said flexible material has first and second darts extending from said V-shaped lower edge to form convex portions in said flexible material, said convex portions being configured for location over the eyes of said domestic animal.

6. A protective eye covering as claimed in claim 1 further comprising:
    a first opening extending through said flexible material adjacent said upper edge and adapted to receive a first ear of said domestic animal; and
    a second opening extending through said flexible material adjacent said upper edge and adapted to receive a second ear of said domestic animal.

7. A protective eye covering as claimed in claim 6 wherein:
    a first fabric portion is secured to a first opening edge of said first opening; and
    a second fabric portion is secured to a second opening edge of said second opening, said first and second fabric portions being configured to provided cushioned engagement between said flexible material and the area proximate the ears of said domestic animal to prevent the entry of insects.

8. A protective eye covering as claimed in claim 7 wherein:
    said flexible material has inside and outside surfaces bordered by said upper edge, said V-shaped lower edge, said first side edge, and said second side edge, said inside surface being configured to face the head of said domestic animal, and said outside surface being located on a side of said flexible material that is opposite from said inside surface;
    said first fabric portion includes a first front side and a first back side, a first seam secures said first front side in contact with said outside surface of said flexible material, said first fabric portion wraps around said first opening edge to cover said first seam, and a second seam connects said first back side in contact with said inside surface of said flexible material; and
    said second fabric portion includes a second front side and a second back side, a third seam secures said second front side in contact with said outside surface of said flexible material, said second fabric portion wraps around said second opening edge, and a fourth seam connects said second back side in contact with said inside surface of said flexible material.

9. A protective eye covering as claimed in claim 6 wherein said domestic animal has a forelock, and said flexible material has a dart extending from said upper edge to a location between said first and second openings, said dart forming a pocket in said flexible material, said pocket being configured for positioning over said forelock and for substantially preventing said protective eye covering from contacting said forelock.

10. A protective eye covering as claimed in claim 9 further comprising a reinforcement strap secured to said flexible material over said dart, and extending from proximate said upper edge to proximate said location between said first and second openings for stiffening said flexible material at said pocket.

11. A protective eye covering as claimed in claim 10 wherein:
    said dart has a wide end at said upper edge and a tapered end at said location; and
    said reinforcement strap has a broad end positioned over said wide end of said dart and a wedge-shaped end positioned over said tapered end of said dart.

12. A protective eye covering for a domestic animal, said domestic animal having a forelock, and said protective eye covering comprising:
    a flexible material for covering the eyes of said domestic animal, said flexible material having an upper edge, a lower edge, a first side edge, and a second side edge;

a first opening extending through said flexible material adjacent said upper edge and adapted to receive a first ear of said domestic animal;

a second opening extending through said flexible material adjacent said upper edge and adapted to receive a second ear of said domestic animal; and a dart extending from said upper edge to a location between said first and second openings, said dart forming a pocket in said flexible material, said pocket being configured for positioning over said forelock and for substantially preventing said protective eye covering from contacting said forelock.

13. A protective eye covering as claimed in claim 12 further comprising a reinforcement strap secured to said flexible material and extending from proximate said upper edge to proximate said location between said first and second openings, said reinforcement strap being secured over said dart for stiffening said flexible material at said pocket.

14. A protective eye covering as claimed in claim 13 wherein:

said dart has a wide end at said upper edge and a tapered end at said location; and said reinforcement strap has a broad end positioned over said wide end of said dart and a wedge-shaped end positioned over said tapered end of said dart.

15. A protective eye covering as claimed in claim 12 wherein:

a first fabric portion is secured to a first opening edge of said first opening; and a second fabric portion is secured to a second opening edge of said second opening, said first and second fabric portions being configured for providing cushioned engagement between said flexible material and the area proximate the ears of said domestic animal to prevent the entry of insects.

16. A protective eye covering as claimed in claim 12 wherein said lower edge of said material is V-shaped and includes:

a first side having first and second ends, said first end being coupled to said first side edge;

a second side having third and fourth ends, said third end being coupled to said second side edge; and an apex at which each of said second and fourth ends intersect, said apex configured to be positioned proximate a longitudinal center line of the muzzle of said domestic animal and to be directed toward the ears of said domestic animal.

17. A protective eye covering for a domestic animal, said domestic animal having a muzzle, said muzzle having an upper muzzle region proximate the eyes of said domestic animal, and a lower muzzle region remote from the eyes of said domestic animal, the mouth and nostrils of said domestic animal being located at said lower muzzle region, said protective eye covering comprising:

a flexible material having
an upper edge configured to be positioned about the head of said domestic animal adjacent to the neck of said domestic animal,
a V-shaped lower edge exhibiting a first side, a second side, and an apex at which a first end of said first side and a second end of said second side intersect, said apex configured to be positioned proximate a longitudinal center line of said upper muzzle region and to be directed toward the ears of said domestic animal,
a first side edge extending between said upper edge and said V-shaped lower edge and defining a first side of said protective eye covering,
a second side edge extending between said upper edge and said V-shaped lower edge and defining a second side of said protective eye covering,
a first dart extending from said first side of said V-shaped lower edge, and
a second dart extending from said second side of said V-shaped lower edge, wherein said first and second darts form convex portions in said flexible material configured for location over the eyes of said domestic animal.

18. A protective eye covering as claimed in claim 17 wherein:

said flexible material has inside and outside surfaces bordered by said upper edge, said V-shaped lower edge, said first side edge, and said second side edge, said inside surface being configured to face the head of said domestic animal, and said outside surface being located on a side of said flexible material that is opposite from said inside surface; and said protective eye covering further includes a fabric for providing cushioned engagement between the upper muzzle region of said domestic animal and said flexible material to prevent the entry of insects, said fabric having a front side wherein a first seam secures said front side of said fabric in contact with said outside surface of said flexible material, and said fabric wraps around said V-shaped lower edge to cover said first seam, and a back side wherein a second seam connects said back side of said fabric in contact with said inside surface of said flexible material.

19. A protective eye covering as claimed in claim 17 comprising:

a first opening extending through said flexible material adjacent said upper edge and adapted to receive a first ear of said domestic animal;

a first fabric portion secured to a first opening edge of said first opening;

a second opening extending through said flexible material adjacent said upper edge and adapted to receive a second ear of said domestic animal; and a second fabric portion is secured to a second opening edge of said second opening, said first and second fabric portions being configured for providing cushioned engagement between said flexible material and the area proximate the ears of said domestic animal to prevent the entry of insects.

20. A protective eye covering as claimed in claim 19 wherein said domestic animal has a forelock, and protective eye covering further comprises means for providing a pocket in said flexible material, said pocket being adapted to substantially prevent said protective eye covering from contacting said forelock, said providing means including:

a dart extending from said upper edge of said flexible material to a position between said first and second openings; and a reinforcement strap secured to said flexible material over said dart, said reinforcement strap extending from said upper edge to said location for stiffening said flexible material at said pocket.

* * * * *

UNITED STATES PATENT AND TRADEMARK OFFICE
CERTIFICATE OF CORRECTION

PATENT NO.   : 6,050,068
DATED        : April 18, 2000
INVENTOR(S)  : Houston R. White, Jr.

It is certified that error appears in the above-indentified patent and that said Letters Patent is hereby corrected as shown below:

In Column 6, Line 31, please delete "suck" and insert --such--.

Signed and Sealed this

Thirteenth Day of February, 2001

*Attest:*

NICHOLAS P. GODICI

*Attesting Officer*   Acting Director of the United States Patent and Trademark Office